United States Patent [19]
Benjamin

[11] 3,727,928
[45] Apr. 17, 1973

[54] COLLET CHUCK
[75] Inventor: Milton L. Benjamin, Chagrin Falls, Ohio
[73] Assignee: Erickson Tool Company, Solon, Ohio
[22] Filed: Oct. 2, 1970
[21] Appl. No.: 77,674

[52] U.S. Cl. ..................279/1 L, 279/47, 279/50
[51] Int. Cl. ..............................................B23b 31/20
[58] Field of Search...................279/1 J, 1 L, 16, 279/47, 50

[56] References Cited
UNITED STATES PATENTS

| 3,332,693 | 7/1967 | Armstrong et al. | 279/47 |
| 3,443,819 | 5/1969 | Benjamin et al. | 279/1 L |
| 2,272,185 | 2/1942 | Chittenden | 279/16 X |

Primary Examiner—Francis S. Husar
Attorney—Oberlin, Maky, Donnelly and Renner

[57] ABSTRACT

A collet chuck of the type wherein a nosepiece having screw-threaded engagement with the chuck body forces a contractible collet axially inwardly of the body to effect contraction of the collet through a nose ring interposed between the axially outer end of the collet and an inturned shoulder on the nosepiece, the collet chuck herein being characterized in that the nose ring has a close axially telescoping fit with the axially outer end portion of the collet and a radial clearance fit within the nosepiece so that the nose ring and collet remain coaxial during operation of the chuck so as to accurately grip a tool or the like with its axis substantially coinciding with the axis of the chuck body.

5 Claims, 2 Drawing Figures

PATENTED APR 17 1973

3,727,928

INVENTOR.
MILTON L. BENJAMIN
BY
Oberlin, Maky, Donnelly & Renner
ATTORNEYS

3,727,928

COLLET CHUCK

BACKGROUND OF THE INVENTION

In known collet chucks of the type referred to wherein a nose ring is interposed between a nosepiece and the axially outer end portion of a contractible collet (see for example the Milton L. Benjamin et al. U.S. Pat. Nos. 3,385,606 and 3,421,770) the nose ring has a radial clearance fit with both the collet and the nosepiece (U.S. Pat. No. 3,385,606) or the nose ring has a close fit with both the collet and the nosepiece (U.S. Pat. No. 3,421,770). In one case when the nosepiece is loosened, the nose ring may assume an eccentric position with respect to the collet, whereby initial tightening of the nosepiece may result in cocking or lateral forces being exerted on the nose ring and on the outer end portion of the collet, thus to tend to shift the collet and tool being gripped thereby out of coaxial relation with the axis of the chuck body. In the other case, where the nose ring has a close fit on the collet and in the nosepiece, eccentricity of the chuck body threads with respect to the body axis and/or eccentricity of the nosepiece threads with respect to the nose ring contacting surfaces thereof, will tend to throw off the nose ring and collet when the nosepiece is tightened thus again tending to laterally shift the collet and tool gripped thereby so that the tool and chuck body axes will not coincide.

SUMMARY OF THE INVENTION

Contrary to known collet chuck constructions, in the present collet chuck the nose ring is a close sliding fit on the outside diameter of the contractible collet, whereby when the nosepiece is tightened, there is no need to laterally shift the nose ring to a coaxial position with respect to the collet because the nose ring is always retained in such coaxial relation on the collet whether the nosepiece be in its tightened or untightened condition.

When the collet cam surface initially contacts the body cam surface both the nose ring and the axially outer end portion of the collet are coaxial with the body axis to effect accurate contraction of the collet and accurate gripping of the tool shank and any inaccuracies in the threads will be compensated for by the ordinary clearances therein such as to allow the nosepiece to assume a firm pressing position without shoving the nose ring and collet laterally during the nosepiece tightening operation.

Other objects and advantages of the present invention will appear hereinafter.

DETAILED DESCRIPTION OF THE INVENTION

Figure 1:
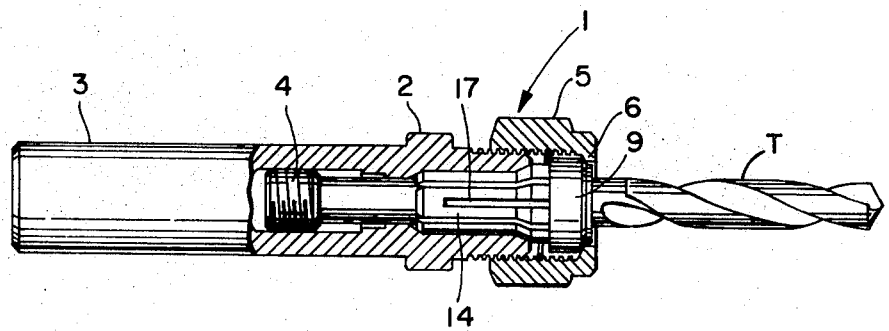
FIG. 1 is a side elevation view partly in cross-section of a collet chuck embodying the present invention.
Figure 2:
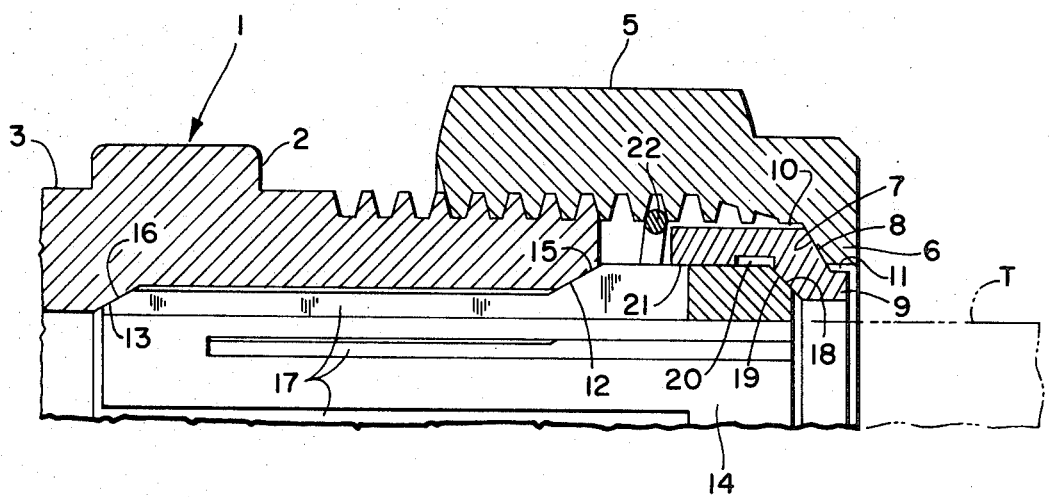
FIG. 2 is a much enlarged fragmentary cross-section view showing the close fit of the nose ring on the outer end portion of the collet and the radial clearance fit of the nose ring within the nosepiece.

The collet chuck 1 herein illustrated by way of illustrative example, comprises a chuck body 2 having a shank 3 within which an adjusting screw 4 is threaded for abutment by the end of the shank of a tool T. The chuck body 2 has screwed thereon a nosepiece 5 having an inturned flange 6 which provides a frusto-conical abutment surface 7 for the corresponding frusto-conical surface 8 of a nose ring 9 disposed within said nosepiece and having a radial clearance at 10 and 11 with the nosepiece 5. The chuck body 2 has axially spaced apart frusto-conical cam surfaces 12 and 13 of equal vertex angle, said cam surfaces 12 and 13 being operative to radially contract the collet 14 when the latter is urged axially inwardly with its frusto-conical cam surfaces 15 and 16 engaged with those in said body 2.

As known in the art, the collet 14 is rendered radially contractible by providing a plurality of slots 17 extending axially from each end toward the other end.

The axially outer end portion of the collet 14 is beveled at 18 for engaging with the correspondingly beveled face 19 of the nose ring 9. Adjacent the beveled surface 19, the nose ring 9 has an undercut 20 to provide grinding relief for grinding of the beveled surface 19 and the interior cylindrical surface 21 which herein is made to a diameter just slightly greater than the outside diameter of the collet 14, i.e., the ID of the nose ring bore 21 may be 0.002 inch greater than the outside diameter of the axially outer end portion of the collet 14. The nose ring 9 may be retained in the nosepiece 5 to prevent separation of the two parts during handling or shipping as by means of a split wire ring 22 which is engaged in a thread groove in the nosepiece 5.

When the nosepiece 5 is loosened the shank of a tool T may be inserted through the collet 14 until its end abuts the stop screw 4. Now, when the nosepiece 5 is tightened, the abutment surface 7 thereof will engage the correspondingly beveled surface 8 of the nose ring 9 and by reason of the engagement of the beveled surfaces 18 and 19 of the nose ring 9 and collet 14, the latter will be urged axially inwardly of the chuck body 2 to cause uniform radial contraction by reason of the interengagement of the parallel frusto-conical cam surfaces 12 and 15 and 13 and 16 of the chuck body 2 and collet 14. By reason of the close sliding fit of the nose ring 9 on the outer end portion of the collet 14, the beveled shoulder 19 of the nose ring 9 will be substantially coaxial with the collet cam surfaces 15 and 16 and body cam surfaces 12 and 13, whereby once the cam surfaces are in contact the axially outer end portion of the collet 14 and the nose ring 9 are firmly held in coaxial relationship whereby even if there are eccentricities in the body threads with respect to the body axis and/or the nosepiece threads with respect to the beveled shoulder 7, the nosepiece 5 may, by the conventional clearances in screw threads, assume a laterally shifted position to firmly and uniformly press the nose ring 9 and collet 14 axially inwardly with respect to the chuck body 2.

In the illustrated embodiment of the invention the cam surfaces 12 and 13 and 15 and 16 are of self-releasing angle, whereby when the nosepiece 5 is loosened, the collet 14 may expand by its own resilience to release the tool T for sharpening or replacement. It is to be understood that the body and collet cam surfaces may be of the self-locking type and in that case, the nose ring 9 may be fashioned to pull the collet 14 axially outwardly of the chuck body 2 as, for example, disclosed in the Milton L. Benjamin et al. U.S. Pat. No. 3,385,606. In any case, the nose ring 9 will have a close fit with the axially outer end portion of the collet 14 to effect accurate clamping of a tool T in the chuck 1. As an illustrative example, it has been found that in a collet chuck constructed in accordance with the present invention the tool T and chuck body 2 axes will be coaxial within 0.0005 inch T.I.R. at a distance of 1 inch from the axially outer end of the nosepiece 5 each time that it is retightened. On the other hand, when the nose ring 9 has a clearance fit with the collet 14, or when the nose ring 9 has a close fit in the nosepiece 5 and a close fit on the collet 14 such degree of accuracy of clamping of a tool T is not assured each time that the nosepiece 5 is tightened.

The surfaces 18 and 19 are beveled as say, a 45° angle to effect some gripping contraction during tightening of the nosepiece 5 although such gripping action is of lower magnitude than the gripping action effected by the body and collet cam surfaces 12-13 and 15-16. The beveled shoulders 7 and 8 of the nosepiece 5 and nose ring 9 are beveled at an angle of, say, about 30° to lessen the tendency of the nose ring 9 being contracted during tightening of the nosepiece 5 and to enable slight tilting action of the nosepiece 5 due to misalignment of the threads of the body 2 and/or nosepiece 5.

When the nosepiece 5 is tightened to effect contraction of the collet 14, the contraction of the OD of the collet 14 where it has an initial close fit in the nose ring bore 21 will be negligible and furthermore, the axially outer portion of the collet 14 will by that time be firmly and accurately supported, not only by the body cam surface 12 and 13 but also by the engagement of the beveled surface 18 of the collet with the beveled surface 19 of the nose ring 9.

I, therefore, particularly point out and distinctly claim as my invention:

1. A chuck comprising a chuck body having a tapered bore; a collet contractible upon axial inward movement against said bore; a nosepiece having threaded engagement with said body; and a nose ring between said collet and said nosepiece; said nosepiece, nose ring, and collet having interengageable radially overlapped faces which overlap only in an axial direction thus to move said collet axially inwardly against said bore in response to tightening of said nosepiece and rotation thereof with respect to said nose ring; said nose ring having a cylindrical bore which is a close axially telescoping fit with the outside diameter of the axially outer end portion of said collet and having an outside diameter which is a radial clearance fit in the threaded bore of said nosepiece, whereby said nose ring is retained by said collet in coaxial position relative to said collet and said tapered bore during tightening of said nosepiece despite eccentricity of the face of said nosepiece which radially overlaps and engages the face of said nose ring.

2. The chuck of claim 1 wherein said tapered bore comprises axially spaced apart frusto-conical surfaces which have vertices of equal angle and wherein said collet has corresponding axially spaced apart tapered surfaces engageable with the respective frusto-conical surfaces of said chuck body whereby, when said collet is moved axially inwardly of said body by tightening of said nosepiece, said collet is radially contracted to grip a tool shank or the like at axially spaced apart regions to stably support said collet within said tapered bore against tilting or lateral displacement.

3. The chuck of claim 1 wherein the radially overlapped faces of said nose ring and collet are beveled to effect radial contraction of said collet at the axially outer end portion thereof in response to tightening of said nosepiece.

4. The chuck of claim 1 wherein the radially overlapped faces of said nosepiece and said nose ring are beveled to enable slight tilting of said nosepiece with respect to said nose ring due to thread eccentricities or misalignment without imposition of substantial lateral forces on said nose ring and collet during tightening of said nosepiece.

5. The chuck of claim 1 wherein a split wire ring in a thread groove of said nosepiece axially retains said nose ring in said nosepiece.

* * * * *